United States Patent
Beer et al.

(10) Patent No.: US 7,225,700 B2
(45) Date of Patent: Jun. 5, 2007

(54) SINGLE-ROD GEAR SHIFTING SYSTEM FOR A MANUAL GEARBOX FOR A MOTOR VEHICLE

(75) Inventors: Uwe Beer, Fahrland (DE); Jens Patzner, Potsdam (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 650 days.

(21) Appl. No.: 10/487,966

(22) PCT Filed: Aug. 24, 2002

(86) PCT No.: PCT/EP02/09486

§ 371 (c)(1),
(2), (4) Date: Feb. 26, 2004

(87) PCT Pub. No.: WO03/021136

PCT Pub. Date: Mar. 13, 2003

(65) Prior Publication Data

US 2004/0221677 A1     Nov. 11, 2004

(30) Foreign Application Priority Data

Aug. 29, 2001   (DE) ............................... 101 42 225

(51) Int. Cl.
*F16H 59/02* (2006.01)
(52) U.S. Cl. ............................... 74/473.37; 74/473.36; 74/335
(58) Field of Classification Search ............ 74/473.36, 74/473.37, 335, 337.5, 473.1
See application file for complete search history.

(56) References Cited

U.S. PATENT DOCUMENTS 1,946,750 A    2/1934   Matthews .................... 74/39

(Continued)

FOREIGN PATENT DOCUMENTS

| DE | 198 59 482 A1 | 10/1999 |
| DE | 199 51 683 A1 | 5/2001 |
| EP | 1 310 707 A1 * | 11/2001 |
| JP | 58174760 A | 10/1983 |

*Primary Examiner*—David M. Fenstermacher
(74) *Attorney, Agent, or Firm*—Davis Bujold & Daniels, PLLC

(57) ABSTRACT

The invention relates to a gear shifting device (2) comprising a single-rod gear shifting system in a housing of a motor vehicle manual gearbox. Said device comprises a central gearshift shaft (32) and fork-type gear shifting elements in the form of gear shifting swinging forks or gear shifting forks (4, 6, 8, 10) which are optionally and individually engaged with the gearshift shaft (32) by rotating the same (32), and which carry out a gear shift of the selected gear shifting element by means of displacement of the gearshift shaft (32) along a rotational axis (34) of said gearshift shaft (32). Said gear shifting device (2) comprises a first element (58, 60) which is connected to the gearshift shaft (32) and which co-operates with a second element (62) fixed in the housing, in order to define the rotation of the gearshift shaft (32). The second element (32) fixed in the housing comprises a number of slits (66) of a defined width, corresponding to the number of gear shifting passages, said slits co-operating with two pins (58, 60) that are arranged on the gearshift shaft (32) and which form the first element. Each one of said pins (58, 60) engages in the slit (66) corresponding to the respective gear shifting passage during the rotation of the gearshift shaft (32), when one of the gear steps is positioned in the selected gear shifting passage.

8 Claims, 3 Drawing Sheets

U.S. PATENT DOCUMENTS

| | | | |
|---|---|---|---|
| 5,291,799 A | 3/1994 | Seaman | 74/473 R |
| 5,809,836 A * | 9/1998 | Patzold et al. | 74/337.5 |
| 6,101,890 A | 8/2000 | Tanba | 74/355 |
| 6,691,590 B1 | 2/2004 | Patzner et al. | 74/473.24 |
| 6,845,685 B2 * | 1/2005 | Brandwitte et al. | 74/473.25 |
| 2005/0005724 A1 * | 1/2005 | Murai et al. | 74/473.36 |

* cited by examiner

SINGLE-ROD GEAR SHIFTING SYSTEM FOR A MANUAL GEARBOX FOR A MOTOR VEHICLE

This application is a national stage completion of PCT/EP02/09486 filed Aug. 24, 2002 which claims priority from German Application Serial No. 101 42 225.3 filed Aug. 29, 2001.

FIELD OF THE INVENTION

The present invention concerns a one-shaft switching device for vehicle manual shaft gearboxes, in particular for six-gear transmissions with a central disengaging shaft and with fork-like switching elements in the form of shifting arms or idlers that engage in sliding sleeves.

BACKGROUND OF THE INVENTION

A one-shaft switching device for a vehicle manual shift gearbox with fork-like shifting arms engaging in sliding sleeves can be pivoted, via at least one disengaging shaft, around parallel pivot bearings from its neutral position into shifting positions, and stationary locking devices in the gearbox housing are equipped with locking grooves in the form of locking shifting arms fastened to the shifting arms and cooperate in such a way that the remaining shifting arms remain locked in their neutral position if one shifting arm is pivoted into a gear position, is known from the Applicant's DE-A 199 51 683. The disengaging shaft positioned parallel to the wheel set actuates the shifting forks or the shifting arms when the gears are shifted. The gear to be shifted is selected when the switching finger of the disengaging shaft is located in a carrier of the switching fork or the shifting arm to be shifted. If a gear is shifted, the shift fingers of the neighboring shifting forks or shifting arms that are not shifted are located below or above the carriers of the shifting fork or the shifting arms. The potential shifting latitude results from the clearance of the shift finger and the carriers of the non-shifted gears. Chamfers at the shift finger of the disengaging shaft and at the carriers of the shifting forks and the shifting arms determine the schematic at the gearshift.

In addition, a switchgear with a disengaging shaft is known from DE-A 198 59 482 that is held in a sliding position in the axial direction and pivotally in its circumferential direction and is equipped with a lever. A plurality of carriers connected with the shifting arms or shifting forks are arranged so as to slide in the axial direction on the disengaging shaft. The disengaging shaft is rotated in the circumferential direction with an actuation lever connected to the disengaging shaft in order to engage the lever at the disengaging shaft, if so desired, with one of the carriers. The disengaging shaft can be moved by the actuation lever in order to move the engaged carrier by means of the lever at the disengaging shaft, so that such an actuation of the disengaging shaft shifts the gears. Located on the disengaging shaft, a first element cooperates with a second element that is fastened on the housing. A groove is provided in one of the elements, which is engaged with the other element in such a way that the movement of the disengaging shaft is defined by the selected direction. The necessary component expenditure for the formation of such a setting is great. Furthermore, an additional array of elements must be provided at the disengaging shaft that has an effect on the length of the disengaging shaft.

The invention is based on the task to provide a switchgear with a setting for the definition of a selected movement that avoids the existing disadvantages.

SUMMARY OF THE INVENTION

A switchgear with a one-shaft switching device is located in a housing of the vehicle manual shift gearbox. The switching device comprises a central disengaging shaft and fork-like switching elements in the form of shifting arms or idlers, which selectively and individually engage the disengaging shaft through the rotation of the disengaging shaft and which perform a gear shift of the selected switching element by pushing the disengaging shaft along the rotating axis of the disengaging shaft. The switching device is provided with a first element connected with the disengaging shaft, that cooperates with a second element fastened on the housing, in order to define the rotating of the disengaging shaft. The second element that is fastened in the housing is equipped with slots of a defined width, whereby the number of the slots corresponds to the number of shifting latitude paths that cooperate with two pins located on the disengaging shaft and forming the first element. One of the pins engages in the appropriate slot that corresponds to the respective shifting latitude path when the disengaging shaft is turned and that lies opposite to the pins after the disengaging shaft has turned when the gear is shifted into a gear level located in the selected shifting latitude paths. In a preferred embodiment, the pins are located on a shift finger with which one of the fork-like switching elements can be moved in order to shift gears. Therefore, the pins are located on the same shift finger that is, otherwise, used for shifting into a gear level. With an appropriate rotation of the disengaging shaft, the slit in which the pins engage corresponds to the shifting latitude path in which those gear levels are located that are used for the shifting process by the switching element whereby the shift finger engages in the appropriate shifting fork or shifting arm. In one embodiment, a groove whose length essentially corresponds to the length of the slots in the second element is located between the two pins. Thus, the axial length of the two elements is kept short and the distance between the pins and the slots is short. In one embodiment, the groove between the two pins cooperates with the carrier located at the fork-like switching element in order to shift gears. In one embodiment, the two pins are located on a slide that is attached to the switch finger. Advantageously, the pins are formed as teeth or cams and the slits are equipped with repulsion slats. The axial expansion of the first and second element, along the rotating axis of the disengaging shaft, is determined by the length of the slots plus the length of the two pins. The length of the slots corresponds to the covered shifting travel of the disengaging shaft. The axial construction length can thereby be shortened, relative to existing systems. As a pin is located at each end of the slot, the axial construction length of the system, consisting of a first and a second element, is no longer determined by the length of the switching latitude path, as the element that can be moved with the disengaging shaft does not have to be moved from one end of the switching latitude path to the opposite end of the same or a neighboring switching latitude path. According to the invention, instead the other pin engages in this slot or in a neighboring slot immediately after one pin has left the slot. Thus, the design of the shifting latitude path can be made more exact. The selected clearance in the switchgear is almost completely minimized. The diagonal switching capability in the transmission, i.e., the possibility to shift easily and comfortably from one switching latitude path to a neighboring switching latitude path, is improved and the shifting comfort is significantly increased. The fulfillment of the comfort requirements goes hand-in-hand with a simultaneous cost reduction. The function of the shift finger at the disengaging shaft and the carriers at the shifting fork or shifting arms is returned and reduced to the original function, which is the shifting process of the selected shifting fork or shifting arm. The contours of the shift finger and the carriers no longer determine the schematic; their tolerances can be designed more roughly, leading to significant cost savings. The result is a high shifting security because the setting-like cooperation of pins and slots facilitates an early shifting latitude rejection, thus avoiding the classical locking process that constitutes the simultaneous actuation of two shifting forks or shifting arms up to the locking of one shifting fork or shifting arm. The element equipped with the slots is fastened to the housing and is bolted together or pinned to the transmission housing. Repulsion slants and the selected clearance are defined in this element at the slots. The selected clearance is transmitted to the disengaging shaft by the pins or cams connected to the disengaging shaft, which are also called single-track cams or contour cams. One pin or cam is located in front of the slots, and another behind the slots. Thus, a double mapping of the shifting latitude path is no longer necessary.

BRIEF DESCRIPTION OF THE DRAWINGS

The invention will now be described, by way of example, with reference to the accompanying drawings in which.

DETAILED DESCRIPTION OF THE INVENTION

Figure 1:
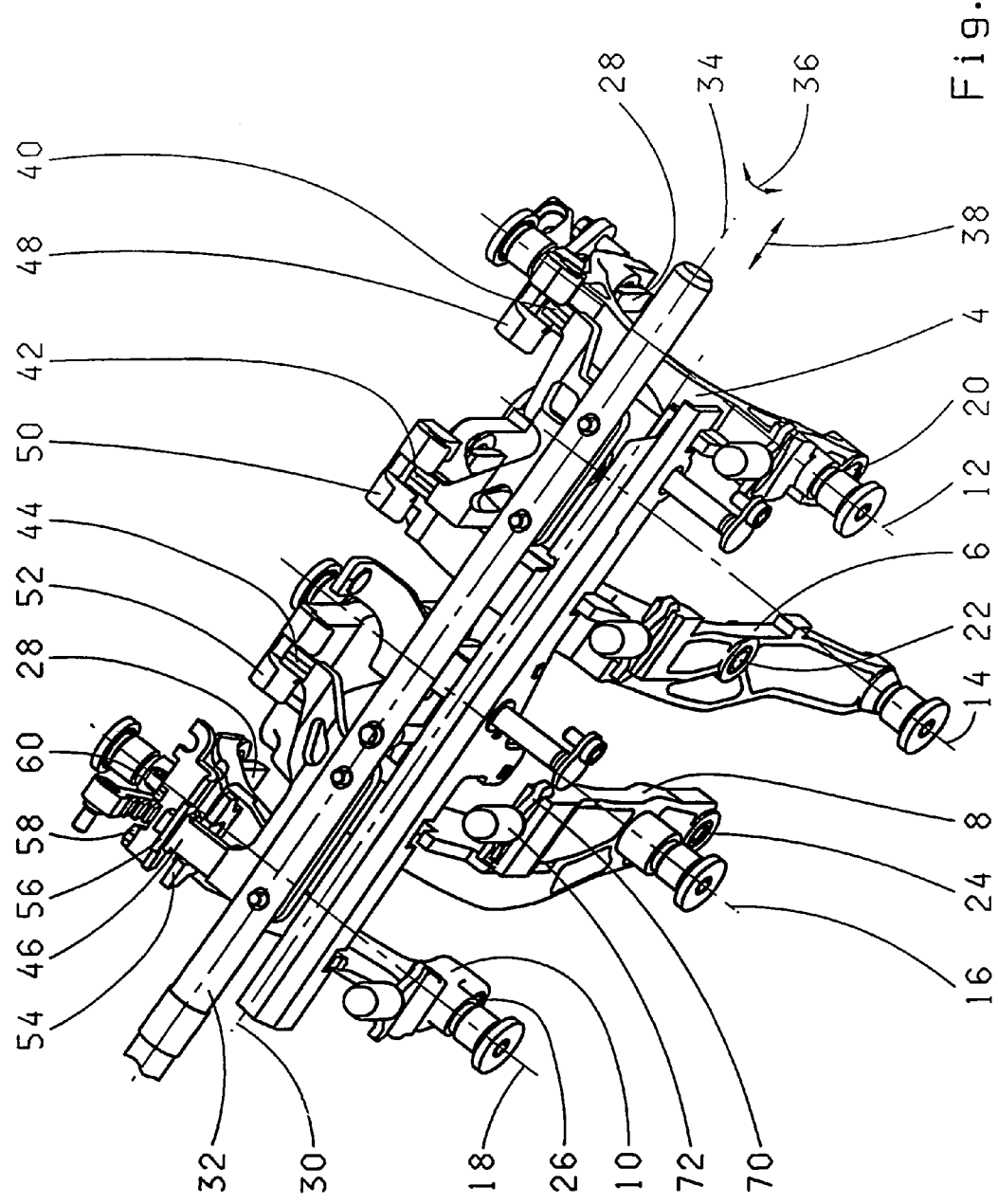
FIG. 1 is a switching device.

A switching device 2 has four shifting arms 4, 6, 8, 10 that are located pivotally around the swivel axes 12, 14, 16, 18 in a transmission housing that is not shown in detail. The shifting arms 4, 6, 8, 10 are designed in the form of forks and are equipped with bearing holes 20, 22, 24, 26 in the area of the fork-like ends where sliding blocks 28 are located pivotally, said sliding blocks being located in the circumferential grooves of switching sleeves belonging to the couplings. The couplings (not shown in detail) rotate around a rotating axis 30. Parallel to the rotating axis 30 and perpendicular to the swivel axes 12, 14, 16, 18, a selection and disengaging shaft 32 is located that can be rotated in the transmission housing around a rotating axis 34 in a rotating direction 36 and that can be axially moved in a switching direction 38. Shift fingers 40, 42, 44, 46 are fastened on the selection and disengaging shaft 32 and arranged at an angle to each other.

The shift fingers 40, 42, 44, 46 engage individually and sequentially with fork-like carriers 48, 50, 52, 54 that are fastened on the shifting arms 4, 6, 8, 10 during a rotational movement of the selection and disengaging shaft 32. The shifting arms 4, 6, 8, 10 and the shift arms 40, 42, 44, 46 are each allocated to individual gears. For example, the shifting arm 4 is allocated to the reverse gear, the shifting arm 6 is allocated to the first and second gear, the shifting arm 8 is allocated to the third and fourth gear, and the shifting arm 10 is allocated to the fifth and sixth gear.

The switching device 2 is shown in a neutral shifting position, whereby the selection and disengaging shaft 32 is rotated in such a way that the shift finger 44 engages with the carrier 52. If the selection and disengaging shaft 32 is moved toward one of the two shifting positions 38, the third or fourth gear is shifted, whereby the corresponding coupling is set via the shifting fork 8 and the corresponding sliding blocks. In the shifting position, the shifting fork 8 can be arrested via an arresting groves 70, whereby an arresting bolt 72 engages with the arresting groove 70. The selection and disengaging shaft 32 is rotated and axially moved via a system of rods (not shown in detail).

A slide 56 is equipped with two single-track cams 58 and 60, which is located on the shift finger 46. This part of the switching device 2 is summarily explained in greater detail in FIG. 2.

Figure 2:
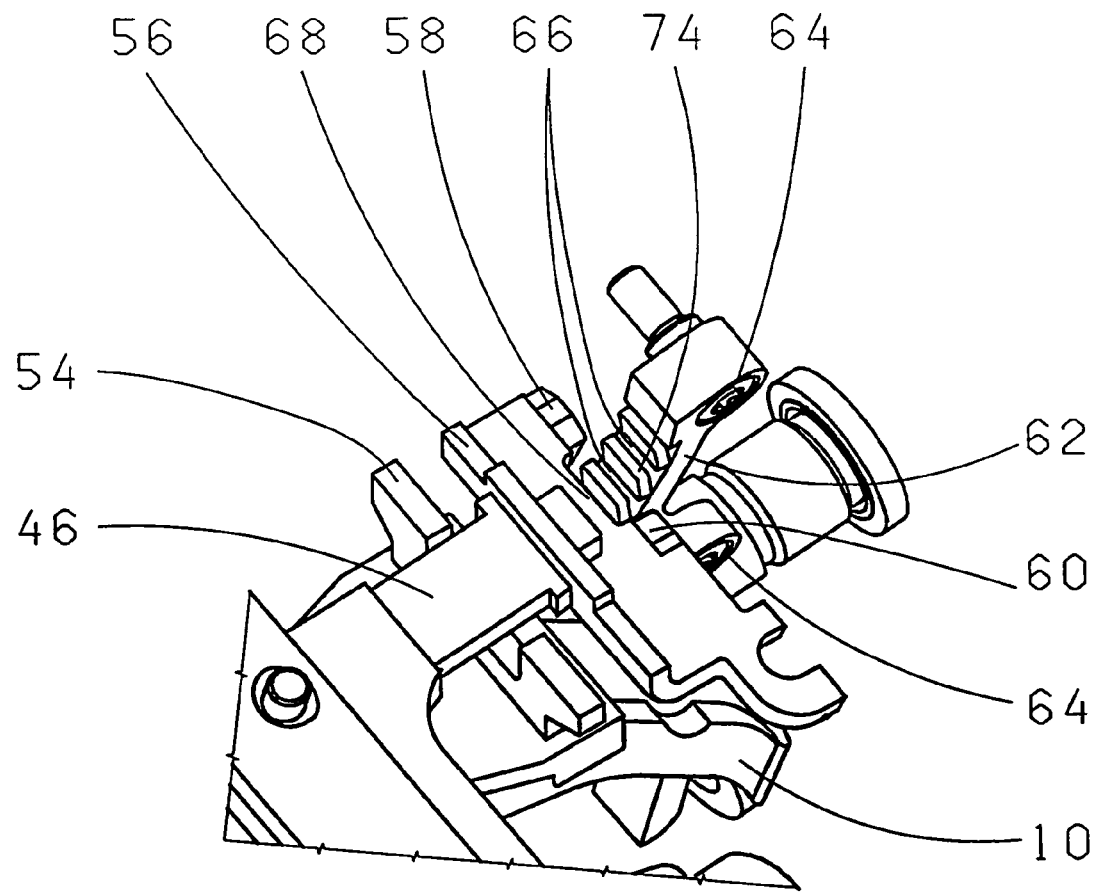
FIG. 2 is a cut-out of a switching device with elements for clearance selection.

FIG. 2 shows the shift finger 46 on the disengaging shaft 32 carrying the slide 56. The shift finger 46 can engage with the fork-like carrier 54 at the shifting fork 10 through the appropriate rotation of the disengaging shaft 32, whereby the fifth or the sixth gear is shifted through the axial movement of the disengaging shaft 32 in the shifting direction 38. In the neutral position of the switchgear 2 as shown, the first single-track cam 58 is on one side of the setting element 62 that is fastened to the transmission housing by means of bolts 64. Slots 66, whose number corresponds to the number of shifting latitude paths, are incorporated in a setting element 62. On the side of the setting element 62, opposite to the single-track cam 58, the single-track cam 60 is provided on the slide 56. A groove 68 between the single-track cam 58 and 60 essentially corresponds to the length of the slots 66. The single-track cams 58 and 60 are equipped with slants that can engage with slants 74 at the slots 66.

Figure 3:
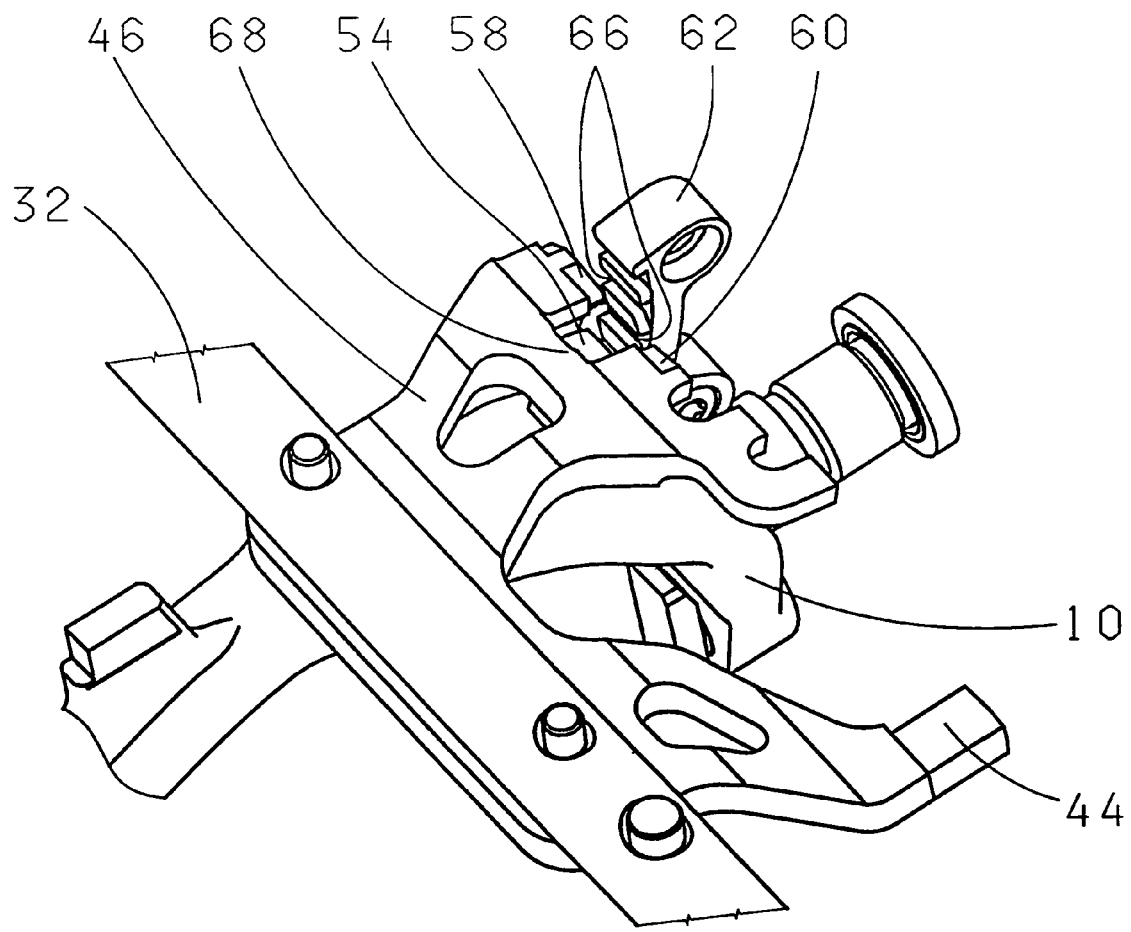
FIG. 3 is a changed embodiment according to FIG. 2.

A changed embodiment is depicted in FIG. 3. In this embodiment, the shift finger 46 is designed in such a way that it is equipped directly with the single-track cams 58 and 60. The groove 68 between the two single-track cams 58 and 60 can be engaged with the carriers 54 which, in this embodiment, take the form of cams, at the shifting fork 10 after the appropriate rotation of the disengaging shaft 32, whereby the fifth or sixth gear is shifted through the axial movement of the disengaging shaft 32 in the shifting direction 38. The setting element 62 with the slots 66 is fastened to the transmission house (the method is not shown). The groove 68 between the single-track cams 58 and 60 essentially corresponds to the length of the slots 66.

REFERENCE NUMERALS 2 switching device
4 shifting arm
6 shifting arm
8 shifting arm
10 shifting arm
12 swivel axis
14 swivel axis
16 swivel axis
18 swivel axis
20 bearing hole
22 bearing hole
24 bearing hole
26 bearing hole
28 sliding block
30 rotating axis
32 selection and disengaging shaft
34 rotating axis
36 rotational direction
38 shifting direction
40 shift finger
42 shift finger
44 shift finger 46 shift finger
48 carrier
50 carrier
52 carrier
54 carrier
56 slide
58 single-track cam
60 single-track cam
62 setting element
64 bolting
66 slot
68 groove
70 arresting groove
72 arresting bolt
74 slant

The invention claimed is:

1. A switchgear (2) with a one-shaft switching device in the housing of a vehicle manual shift gearbox comprising a central disengaging shaft (32) and fork-like shifting elements in the form of shifting arms or shifting forks (4, 6, 8, 10), which selectively and individually engage with the disengaging shaft (32) through the rotation of the disengaging shaft (32) and which perform a gear shift of the selected shifting element through the movement of the disengaging shaft (32) along the rotating axis of the disengaging shaft (34) and where the switching element (2) is equipped with a first element (58, 60) connected with the disengaging shaft (32) that cooperates with a second element (62) that is fastened on the housing to define the rotation of the disengaging shaft, wherein the second element (62) fastened on the housing is equipped with slots (66) of defined width in a number corresponding to the number of shifting latitude paths that cooperate with two pins (58, 60) located on the disengaging shaft (32), which form the first element and where one of the pins (58, 60), when a gear level located in one of the selected shifting latitude paths is shifted, engages in the appropriate slot (66) that corresponds to the appropriate shifting latitude path when the disengaging shaft (32) is rotated.

2. The switchgear (2) according to claim 1, wherein the pins (58, 60) are located on a shift finger (46) with which one of the fork-like shifting elements (10) can be moved for the shifting of gears.

3. The switchgear (2) according to claim 1, wherein a groove (68) is provided between the two pins (58, 60) that essentially corresponds to the length of the slots (66) in the second element (62).

4. The switchgear (2) according to claim 3, wherein the groove (68) between the two pins (58, 60) is working together with one carrier (54) located on the fork-like switching element (10) to shift gears.

5. The switchgear (2) according to claim 2, wherein the two pins (58, 60) are located on a slide (56) that is attached on the shift finger (46).

6. The switchgear (2) according to claim 1, wherein the axial expansion of the first (58, 60) and the second element (62) along the rotating axis (34) of the disengaging shaft (32) is essentially determined by the length of the slots (66) plus the length of the two pins (58, 60).

7. The switchgear (2) according to claim 1, wherein that the pins (58, 60) are designed as teeth or cams.

8. The switchgear (2) according to claim 1, wherein the slots (66) are equipped with repulsion slants (74).

* * * * *